Patented Feb. 15, 1944

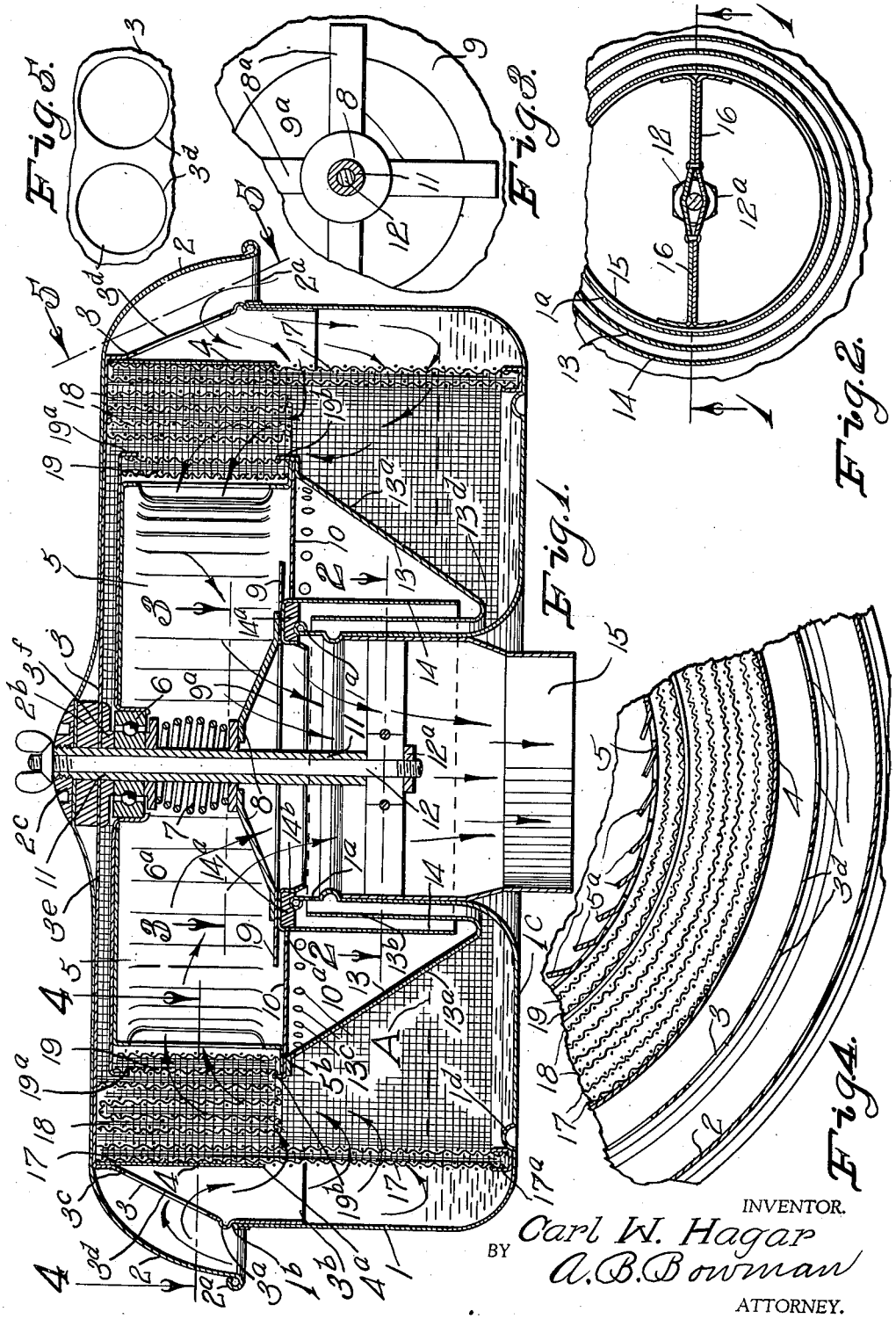

2,341,771

UNITED STATES PATENT OFFICE 2,341,771

AIR CLEANER

Carl W. Hagar, San Diego, Calif.

Application December 31, 1940, Serial No. 372,480

2 Claims. (Cl. 183—15)

My invention relates to an air cleaner, more particularly an air cleaner for use in connection with various types of internal combustion engines and the objects of my invention are:

First, to provide an air cleaner of this class in which a revolubly mounted louver operated structure is arranged to be revolved by the air draft passing through said air cleaner, whereby centrifugal force in the oil sump thereof is created by the revolution of said louver operated structure for uniform centrifugal distribution of oil from said sump onto the filter elements positioned outwardly of said louver operated structure.

Second, to provide an air cleaner of this class in which a revolubly mounted louver operated structure is provided with an annular, upwardly and outwardly extending angular portion, which portion extends into the oil in the sump of my air cleaner whereby revoluble movement of said louver operated structure provides centrifugal directional force of said oil upwardly and outwardly on said upwardly and outwardly extending angular portion thereof directing said oil uniformly and evenly upon a filtering element positioned outwardly of said louver operated structure;

Third, to provide an air cleaner of this class which bathes the air stream passing therethrough with oil and also filters the air stream by means of an oil saturated filtering medium;

Fourth, to provide an air cleaner of this class in which a revolubly mounted louver structure positioned internally of the outer casing of my air cleaner operates as a filtering medium and also as a centrifugal oil pump for radially spraying the oil and bathing the air stream passing through my air cleaner with oil spray.

Fifth, to provide an air cleaner of this class in which oil is sprayed across the air stream in transverse relation therewith as said air stream passes through my air cleaner;

Sixth, to provide an air cleaner of this class in which any fine particles of oil in the air stream when in the vortex at the central portion of my air cleaner tend to move outwardly away from said outlet due to centrifugal force created at said vortex;

Seventh, to provide an air cleaner of this class in which louver operated revolubly mounted structure is very freely rotatable providing efficient operation of my air cleaner at various velocities and with varying volumes of the air stream passing therethrough;

Eighth, to provide an air cleaner of this class with a filtering element of relatively great area which is constantly sprayed with oil attaining high efficiency of my air cleaner and maintaining relatively low resistance to the passage of air through said air cleaner;

Ninth, to provide an air cleaner of this class in which liquid absorption of heavy matter and cotton-like fibrous matter is accomplished by precleaning of the air stream as it passes into my air cleaner over the sump oil level thereof before the air enters the oil saturated filtering element of my air cleaner;

Tenth, to provide a novel air cleaner of this class; and

Eleventh, to provide an air cleaner of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a sectional view of my air cleaner taken from the line 1—1 of Fig. 2 showing by arrows the path of the air stream through my air cleaner; Fig. 2 is a fragmentary sectional view taken from the line 2—2 of Fig. 1; Fig. 3 is a fragmentary sectional view taken from the line 3—3 of Fig. 1; Fig. 4 is a fragmentary sectional view taken from the line 4—4 of Fig. 1 and Fig. 5 is a fragmentary sectional view taken from the line 5—5 of Fig. 1.

Similar characters of reference refer to similar parts and portions throughout the several views of the drawing:

The outer casing member 1, casing cover member 2, filter element supporting member 3, baffle member 4, louver member 5, louver member supporting bearing 6, spring 7, spider member 8, baffle plates 9 and 10, tube 11, bolt 12, centrifugal oil conducting member 13, baffle member 14, air outlet conductor member 15, conductor member connection brackets 16 and the filtering elements 17, 18 and 19 constitute the principal parts and portions of my air cleaner.

The outer casing member 1 is substantially cup-shaped in form, as shown in Fig. 1 of the drawing, and is provided with an upwardly extending centrally positioned cylindrical portion 1a which is open at the upper side and arranged to receive the air outlet conductor 15 internally thereof, as shown best in Fig. 1 of the drawing.

The outer annular edge portion 1b of the outer casing member 1 is arranged to support the annular bead portion 3a of the filter element supporting member 3 and this filter element supporting member 3 is provided with an annular skirt portion 3b positioned internally of the outer casing member 1 inwardly of the annular edge portion 1b thereof, as shown best in Fig. 1 of the drawing. The filter element supporting member 3 is provided with an inwardly and upwardly extending annular portion 3c in which a plurality of openings 3d are positioned as shown best in Figs. 1 and 5 of the drawing. These openings 3d provide passages for the intake of air into my air cleaner, as indicated by arrows in Fig. 1 of the drawing.

Integral with said inwardly and upwardly extending annular portion 3c is a disc-like portion 3e on the upper side of which is positioned the casing cover member 2. This casing cover member 2 is provided with outwardly and downwardly curved skirt portions 2a, which extend below the openings 3d in the filter element supporting member 3 and outwardly thereof in spaced relation from the outer side of the outer casing member 1, all as shown best in Fig. 1 of the drawing.

Secured to the filter element supporting member 3 is a substantially annular band-like baffle member 4. This baffle member 4 is positioned inwardly of the openings 3d in the filter element supporting member 3 and the lower edge portion 4a of said baffle member 4 extends some distance below the openings 3d, as shown best in Fig. 1 of the drawing.

Secured to the inner side of this baffle member 4 and to the under side of the filter element supporting member 3 is the filtering element 17 which is composed of two annular pieces of screen wire or the like. These annular pieces of screen wire are positioned in spaced relation from each other and extend from the lower side of the filter element supporting member 3 downwardly to the bottom portion 1c of the outer casing member 1. Embracing the lower edges of these annular pieces of screen is a substantially annular channel shaped member 17a. This annular channel-shaped member 17a engages an annular indented portion 1d in the bottom 1c of the outer casing member 1 supporting the filter element 17 in concentric relation with the outer casing member 1 in conforming spaced relation with the entire periphery thereof.

Positioned intermediate the casing cover member 2 and the filter element supporting member 3 at the central portions thereof is a spacer member 2b. Secured on the lower side of the filter element supporting member 3 in conforming relation with the spacer member 2b is a spacer member 3f which is arranged to engage the louver member bearing 6 and maintain the same in proper spaced relation from the lower side of said filter element supporting member 3.

The tube 11 is a hollow cylindrical member arranged to receive the bolt 12 which is rigidly secured to the conductor member connection brackets 16, as shown best in Figs. 1 and 2 of the drawing.

As hereinbefore described, the air outlet conductor 15 is rigidly secured on the inner side of the centrally positioned upwardly extending portion 1a of the outer casing member 1 and the conductor member connection brackets 16 are rigidly secured to said air outlet conductor member 15.

The bolt 12 is arranged in rigid connected relation with the conductor member connection brackets 16 by means of the nut 12a, as shown best in Figs. 1 and 2 of the drawing.

The tube 11 is normally positioned on the bolt 12 in substantially the relation as shown in Fig. 1 of the drawing, it being noted that the tube 11 is engaged by the nut 2c at its upper end and that the collar 6a in engagement with the lower side of the louver member bearing 6 is rigidly secured on the outer side of said tube 11 whereby the louver member bearing 6 is rigidly engaged by said collar 6a in opposed relation to the spacer member 3f on the under side of the filter element supporting member 3. By tightening the nut 2c on the upper end of the tube 11, the collar 6a is forced into close engaged relation with the lower side of the louver member bearing 6, all as shown best in Fig. 1 of the drawing.

Engaging the lower side of the collar 6a is the spring 7 which is a compression spring arranged to compress the gasket member 14a into engagement with the upper annular edge of the cylindrical portion 1a of the outer casing member 1 by means of engagement with the upper side of the spider member 8 which is secured to the baffle plate 9 on the under side of which is secured the baffle member 14, all as shown best in Fig. 1 of the drawing. The spring 7 is substantially cylindrical in form and is positioned around the tube 11 and is arranged to force the spider member 8 longitudinally on the tube 11 maintaining constant engaged relation of said gasket member 14a and the upper annular edge of the outer casing portions 1a, all as shown best in Fig. 1 of the drawing. The spider member 8 is provided with radiating arm portions 8a which are secured to the upper side of the baffle plate 9, as shown best in Figs. 1 and 3 of the drawing. This baffle plate 9 is provided with a central opening 9a providing a passage for the air stream in communicative relation with the interior of the air outlet conductor member 15, as shown best in Figs. 1 and 3 of the drawing.

The baffle member 14 is substantially cylindrical in form and is provided with an annular channel-shaped portion 14b on its one end in which is positioned the gasket member 14a, as shown best in Fig. 1 of the drawing.

The louver member 5 is mounted in rigid connected relation with the louver member bearing 6 which is a conventional ball bearing mounted concentrically of the outer casing member 1. The louver member 5 is substantially cylindrical in form and is provided with a plurality of angularly disposed louver portions 5a in its peripheral side wall which louver portions 5a are arranged to be engaged by the air stream passing through my air cleaner whereby the louver member 5 is revolubly operated by said air stream.

Rigidly connected with the lower peripheral portion 5b of the louver member 5 is a baffle plate 10. This baffle plate 10 is provided with a central opening 10a therein, which opening 10a provides space in the baffle plate 10 in which is concentrically positioned the baffle member 14, the annular side wall of which is arranged at substantially right angles thereto. It will be noted that the baffle plates 9 and 10 overlap each other intermediate the baffle member 14 and the peripheral outline of the louver member 5, all as shown best in Fig. 1 of the drawing.

Positioned outwardly of the periphery of the louver member 5 is the filtering element 19. This filtering element 19 is composed of two spaced annular pieces of screen wire, or the like, and this filtering element 19 is supported by annular flanged portions 19a and 19b which are sheet metal flange portions in rigid connected relation with the louver member 5, all as shown best in Fig. 1 of the drawing.

It will be noted that this filtering element 19 is positioned around the entire periphery of the louver member 5 in spaced relation from the louver portions 5a thereof and serves as a third filter element and also buffets outwardly any particles of liquid which tends to enter the louver member 5.

The centrifugal oil conductor member 13 is an annular substantially frusto-conical member positioned in inverted relation and secured to the lower side of the baffle plate 10 near the periphery of the louver member 5. The angular and annular side wall portions 13a of this centrifugal oil conducting member 13 converges downwardly and inwardly toward the centrally positioned cylindrical casing portion 1a of the outer casing member 1 and this centrifugal oil conducting member 13 is provided with an upwardly extending annular cylindrical portion 13b which is positioned in spaced conforming relation with the outer side of the cylindrical casing portion 1a of the outer casing portion 1.

It will be noted that this cylindrical portion 13b is positioned intermediate the casing portion 1a and the baffle member 14 and that the baffle member 14 and said cylindrical portion 13b overlap each other, all as shown best in Fig. 1 of the drawing. This centrifugal oil conducting member 13 is provided with openings 13c therein near the lower side of the louver member 5, as shown best in Fig. 1 of the drawing.

It will be here noted that the outer casing member 1 is partially filled with oil or other liquid to substantially the level A, as shown in Fig. 1 of the drawing. This level A is positioned a considerable distance above the lower annular portion 13d of the centrifugal oil conducting member 13 providing a substantial engaged relation of the centrifugal oil conducting member 13 with the oil or other liquid positioned in the lower sump portion of the outer casing member 1, all as shown best in Fig. 1 of the drawing.

Positioned intermediate the filtering elements 17 and 19 is the filtering element 18, which filtering element 18 is composed of annular pieces of spaced screen wire or the like extending from the lower side of the filter element supporting member 3 to substantially the lower side of the louver member 5 slightly above the openings 13c in the centrifugal oil conducting member 13.

It will be noted that the innermost layer of screen wire of the filtering element 18 is positioned in spaced relation with the outer side of the filtering elements 19 permitting free unobstructed revoluble operation of the filtering element 19 in its rigid connected relation with the louver member 5.

The operation of my air cleaner is substantially as follows: Assuming that the air outlet conductor 15 is positioned in communicative relation with the intake of a conventional internal combustion engine, or carburetor thereof, the vacuum created in my air cleaner by said intake causes air to pass through my air cleaner in substantially the direction as indicated by arrows in Fig. 1 of the drawing. The air passing into my air cleaner passes beneath the skirt portion 2a of the casing cover member 2 inwardly through the openings 3d of the filter element supporting member 3 and downwardly toward the oil level A in the outer casing 1 outwardly of the filtering element 17. Heavy delterious matter and cotton-like fibrous material is absorbed by the liquid outwardly of the filtering element 17 and the air passes through the filter element 17 upwardly through the filtering elements 18 inwardly through the filtering elements 19 and through the louver portions 5a of the louver member 5, it being here noted that the filtering element 19 also buffets outwardly any particles of liquid which tend to enter the louver member 5 during revoluble action. As the air passes through these louver portions 5a, the force of the air stream thereon tends to revolve the louver member 5 together with the baffle plate 10, centrifugal oil conducting member 13 and the filtering element 19. After the air passes through the louver portions 5a of the louver member 5, it passes inwardly between the radially extending finger portions 8a of the spider member 8 then downwardly through the opening 9a of the baffle plate 9, after which the air passes through the air outlet conductor 15 and into the intake of the internal combustion engine to which my air cleaner is connected. As the louver member 5 revolves together with the centrifugal oil conducting member 13, the engagement of the centrifugal oil conducting member 13 with the oil or other liquid in the sump portion of the outer casing 1 causes centrifugal force to direct the oil or other liquids upwardly along the outer inclined surface 13a of the centrifugal oil conducting member 13, as indicated by arrows in Fig. 1 of the drawing. The oil or other liquid passing upwardly along the inclined surface 13a of the centrifugal oil conducting member 13 by centrifugal force is directed outwardly therefrom and said oil passes beneath the filtering element 18 toward the filtering element 17. The oil or other liquid passing outwardly from the inclined annular surface 13a of the centrifugal oil conducting member 13 provides complete uniform saturation of the filtering element 17 and said oil passing outwardly toward said filtering element 17 crosses the air stream passing through my air cleaner thoroughly washing the same before it enters the filtering element 18. The lower portion 13b of the centrifugal conducting member 13 being immersed in the oil or other liquid in the outer casing 1 prevents the air stream from passing beneath said portion 13d over the upwardly extending portion 13b and around the baffle member 14 and the baffle plates 9 and 10. It will be readily observed that substantially the entire air stream must pass through the filtering elements 18 and 19 and through the louver portions 5a of the louver member 5. It will be here noted that the revoluble operation of the louver member 5 imparts centrifugal force to the air passing therethrough causing a vortex above the air outlet conductor member 15 inwardly of the louver portion 5a of the louver member 5 tending to separate the oil spray from the air before it passes downwardly through the air outlet conductor 15. Streams of oil separated from the air stream by centrifugal action pass outwardly in vortex relation from the central portion of my air cleaner providing a structure in which the oil does not pass with the air into the intake of the internal combustion engine to which my air cleaner is connected. The openings 13c in the centrifugal oil conducting member 13 are arranged to provide an outlet for oil which may collect in molecular or other form internally thereof.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an air cleaner of the class described, the combination of a stationary outer casing, a stationary annular filter element secured thereto in spaced relation from the outer wall of said casing, an annular revolubly mounted louver member in said casing inwardly of said stationary filter element with louver portions arranged in chordal relation with its periphery and in a row, a revoluble filter element surrounding its louver portions and carried thereby and coextensive therewith, said outer casing provided with a sump portion at its lower end arranged to contain liquid therein and on opposite sides of said stationary filter member, an inverted frusto-conical centrifugal liquid conducting means rigidly secured to said louver member engaging with said liquid in said sump and arranged for conducting said liquid upwardly and outwardly, said revoluble filter element positioned outwardly of said centrifugal liquid conducting means and arranged to receive the liquid from said liquid conducting means, and baffle means in cooperative relation with said centrifugal liquid conducting member and said louver member whereby substantially the entire air stream passing through said air cleaner passes through said louver portions.

2. In an air cleaner of the class described, the combination of a stationary outer casing, a stationary annular filter element secured thereto in spaced relation from the outer wall of said casing, an annular revolubly mounted louver member in said casing inwardly of said stationary filter element with louver portions arranged in chordal relation with its periphery and in a row, a revoluble filter element surrounding its louver portions and carried thereby and coextensive therewith, said outer casing provided with a sump portion at its lower end arranged to contain liquid therein and on opposite sides of said stationary filter member, and an inverted frusto-conical centrifugal liquid conducting means rigidly secured to said louver member engaging with said liquid in said sump and arranged for conducting said liquid upwardly and outwardly, said centrifugal liquid conducting means extending outwardly and upwardly in diverging relation with the axis of said louver member whereby liquid from said sump is conducted upwardly and outwardly to the outer side of said revoluble filter element toward said stationary filter element.

CARL W. HAGAR.